United States Patent
Weston et al.

(10) Patent No.: US 9,344,533 B2
(45) Date of Patent: *May 17, 2016

(54) RECEIVE WINDOW AUTO-TUNING

(71) Applicants: Kevin T. Weston, Kirkland, WA (US); Abolade Gbadegesin, Redmond, WA (US); Deepak Bansal, Redmond, WA (US); Murari Sridharan, Redmond, WA (US); Sanjay N. Kaniyar, Redmond, WA (US)

(72) Inventors: Kevin T. Weston, Kirkland, WA (US); Abolade Gbadegesin, Redmond, WA (US); Deepak Bansal, Redmond, WA (US); Murari Sridharan, Redmond, WA (US); Sanjay N. Kaniyar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 488 days.

This patent is subject to a terminal disclaimer.

(21) Appl. No.: 13/657,864

(22) Filed: Oct. 23, 2012

(65) Prior Publication Data

US 2014/0115186 A1 Apr. 24, 2014

(51) Int. Cl.
*G06F 15/16* (2006.01)
*H04L 29/06* (2006.01)

(52) U.S. Cl.
CPC .................... *H04L 69/163* (2013.01)

(58) Field of Classification Search
USPC ........................ 709/230, 235, 236
See application file for complete search history.

(56) References Cited

U.S. PATENT DOCUMENTS

| | | |
|---|---|---|
| 6,046,979 A | 4/2000 | Bauman |
| 6,415,410 B1 | 7/2002 | Kanerva et al. |
| 6,473,793 B1 | 10/2002 | Dillon |
| 6,654,344 B1 | 11/2003 | Toporek |
| 6,711,137 B1 | 3/2004 | Klassen |
| 6,788,704 B1 | 9/2004 | Lindsay |
| 7,283,474 B1 | 10/2007 | Bergenwall |
| 7,436,778 B1 | 10/2008 | Iannaccone et al. |
| 2002/0112057 A1 | 8/2002 | Srinivas et al. |
| 2002/0181494 A1 | 12/2002 | Rhee |
| 2003/0165160 A1 | 9/2003 | Minami et al. |
| 2003/0177395 A1 | 9/2003 | Pardee et al. |
| 2004/0120256 A1 * | 6/2004 | Park .............................. 370/235 |

OTHER PUBLICATIONS

Title: Socket Buffer Auto-Sizing for High-Performance Data Transfers Publication: Journal of Grid Computing 2003, vol. 1, Issue 4, pp. 361-376 Authors: Ravi S. Prasad, Manish Jain and Constantinos Dovrolis.*

Jacobson, V., "Congestion Avoidance and Control," Computer Communication Review 18:4, Aug. 1988; pp. 314-329.

(Continued)

*Primary Examiner* — Umar Cheema
*Assistant Examiner* — Marshall McLeod
(74) *Attorney, Agent, or Firm* — Jim Banowsky; Kate Drakos; Micky Minhas

(57) ABSTRACT

Methods of tuning a receive window. A receiving device and a sending device may be in communication over a network. The receiving device may advertise a receive window to the sending device. The size of the receive window may be adjusted over time based on one or more connection parameters, application parameters and/or operating system parameters.

20 Claims, 4 Drawing Sheets

(56) References Cited

OTHER PUBLICATIONS

Stevens, W. R., TCP/IP illustrated vol. I The Protocols, Chap. 20.3, 20.6 and 20.7, Addison-Wesley Publishing Company, Reading, Massachusetts, 1994; pp. 280-282; 285-292.

Semke et al., "Automatic TCP Buffer Tuning," Proc of SIGCOMM98, Vancouver, B.C., Aug. 1998.

Tolunay., "Windows optimizations for broadband connections (RWIN)" downloaded from http://www.dslreports.com/tweaks, on Mar. 13, 2001, 5 pages.

R. Wang, M. Valla, M.Y Sanadidi and M. Gerla, "Adaptive Bandwidth Share Estimation in TCP Westwood", http://www.cs.ucla.edu/~renwang/pubs/globecom2002.pdf, 2002, pp. 1-6.

"TCP auto-tuning zoo," Auto-Tuning Review, http://www.csm.ornl.gov/~dunigan/net100/auto.html, printed on Aug. 20, 2005, pp. 1-7.

J. W. Heffner, "High Bandwidth TCP Queuing," thesis, Jul. 24, 2002, pp. 1-17.

Los Alamos National Laboratory, "Dynamic Right Sizing," http://public.lanl.gov/radiant/research/hpn/drs.html, printed on Aug. 20, 2005, p. 1.

Lee ("A receiver-driven TCP flow control in CDMA2000 wireless networks with constrained mobile resources", Computer Networks, May 2004, pp. 237-252, retrieved on Jul. 28, 2011 at http://www.sciencedirect.com/science?_ob=Mlmg&imagekey=B6VRG-4CG-M4PD-1-2J&_cdi=6234&_user=2502287&_pii=S13891286040-01185&_origin=&_coverDate=10%2F07%2F2004&_sk=9995-39997&vi.

Jacobson V., ("TCP Extensions for High Performance", RFC 1323, 1992, pp. 1-32, retrieved on Jan. 21, 2009 at http://www.ietf.org/rfc/rfc1323.txt?number=1323).

IBM Technical Disclosure Bulletin ("Dynamic Computation of TCP Maximum Window Size for Directly Connected Hosts", vol. 37, 1994, especially pp. 2-4.

Stevens, W., ("TCP Slow Start, Congestion Avoidance, Fast Retransmit, and Fast Recovery Algorithms", RFC 2001, 1997, pp. 1-5, especially pp. 1-3, retrieved on Jan. 14, 2009 at http://www.ietf.org/rfc/rfc2001.txt?number=2001).

Allman M., ("TCP Congestion Control", RFC 2581, 1999, pp. 1-14, retrieved on Jan. 14, 2009 at http://www.ietf.org/rfc/rfc2581.txt?number=2581).

Fisk M., ("Dynamic Right-Sizing: TCP Flow-Control Adaptation", Proceedings of the 14$^{th}$ Annual ACM/IEEE Conference, pp. 1-3, retrieved on Jan. 14, 2009 at http://public.lanl.gov/radiant/pubs/drs/icccn01-drs.pdf).

\* cited by examiner ns, and the connection parameters may change over time. For example, the connection's share of the bandwidth may change, the rate at which the sending device sends data may change, and the rate at which an application can process the data may change. As a result, a static or poorly sized receive window may be too small some in some situations and too large in others. The inventors have appreciated that it may be desirable to provide a receive window having a size that is determined based on connection parameters, application parameters, operating system parameters and/or other parameters.

In one aspect of the invention, the connection's share of the bandwidth and the round trip time for a connection may be estimated. A new receive window size may be determined as a function of the estimated bandwidth and round trip time. For example, the new receive window size may be calculated by multiplying the estimated bandwidth and the estimated round trip time. The calculated receive window size may be adjusted based on various parameters. For example, the calculated receive window may be adjusted by a scaling factor based on a change in the rate at which data is received. Once a new receive window size is calculated, the receive window may be set to the calculated receive window size.

In another aspect, the invention relates to a method, implemented by a processor, of communicating over a network using a receive window having a first receive window size. The method includes determining an estimated round trip time for a connection and determining an estimated bandwidth for the connection. The method also includes determining a second receive window size as a function of the estimated round trip time and the estimated bandwidth. The method further includes providing the receive window with the second receive window size.

In yet another aspect, the invention relates to a computer-readable medium having computer-executable instructions implemented by a processor for performing steps. The steps include determining an estimated round trip time for a connection and determining an estimated bandwidth for the connection. The steps also include determining a second receive window size as a function of the estimated round trip time and the estimated bandwidth. The steps further includes providing the receive window with the second receive window size.

RECEIVE WINDOW AUTO-TUNING

RELATED APPLICATIONS

This application is a continuation of and claims benefit from U.S. patent application Ser. No. 13/396,031 that was filed on Feb. 14, 2012, and that is a continuation of and claims benefit from U.S. patent application Ser. No. 11/239,961 that was filed on Sep. 30, 2005, each of which is incorporated, herein by reference in its entirety.

BACKGROUND OF INVENTION

1. Field of Invention

The invention is related to communicating between devices using a receive window.

2. Discussion of Related Art

When two computers communicate over a network, a sending computer may send data to a receiving computer. In some circumstances, the receiving computer may not be able to process the data as quickly as it is received. For example, if the sending computer is a faster computer than the receiving computer, the receiving computer may be overwhelmed, by the amount of data sent and various problems may occur. For example, some of the data may be lost.

The receiving computer may store the received data in a receive buffer. The received data may remain in the receive buffer temporarily until an application processes the data. If data is received too quickly, it may not be possible for the receiving computer to process the data fast enough. If the receive buffer becomes full, data may be lost and the sender may need, to re-send the lost data.

To prevent a fast sending computer from overwhelming a slow receiving computer with too much data, Transmission Control Protocol (TCP) defines a "receive window." The receive window is the maximum amount of data that the sending computer is allowed to send to the receiving computer before receipt of at least some of the data is acknowledged. The receive window may limit the amount of data (e.g., defined in bytes) that the sending computer may have outstanding (i.e., unacknowledged) to the receiving computer at any given time. Once the sending computer sends the maximum amount of data, the sending computer may not be allowed to send more data until it receives an acknowledgement that at least some of the data has been received.

The receiving computer may advertise the receive window to the sending computer. The size of the receive window may be the size of the receive buffer minus the amount of data currently stored in the receive buffer, per TCP convention.

Some operating systems provide receive windows that are statically-configured. To change the size of the receive window, a person may need to change it manually. A statically-configured receive window may cause the receive window to be too large in some situations and too small in other situations.

One approach to adaptively tuning the receive window is known as "dynamic rightsizing," and is implemented on some Linux operating systems. Dynamic rightsizing may increase the receive window size in predetermined increments. For example, if the receiver determines that the receive window is too small, it may double the size of the receive window. If the receiver subsequently determines that the receive window size is again too small, the receive window size may be doubled yet again.

SUMMARY OF INVENTION

For devices in communication over a network, various connection parameters may be different for different connec-

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
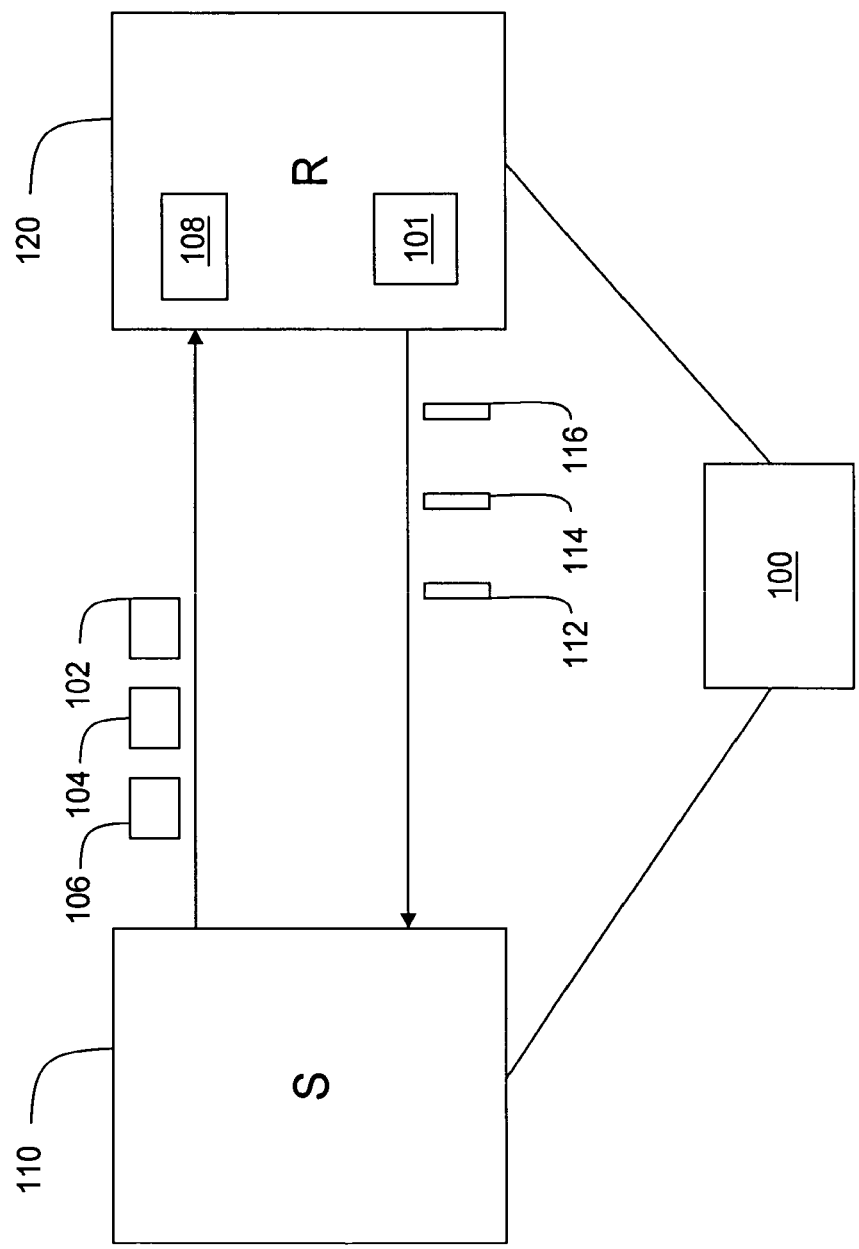
FIG. 1 is a block diagram illustrating a network environment in which the invention may be practiced.

When a device communicates with another device over a network, different connections may have different connection parameters, and the connection parameters may change over time. For example, the device may communicate with devices that are located in a variety of different geographical locations. It may take longer for data to be sent to a distant location than to a local location, and the propagation time of data may change over time. As another example, the bandwidth available for the connection may change depending on a number of factors, e.g., the number of applications used on the device, the amount of bandwidth available on the network and the speed with which an application can process data that is received at the device.

A receive window that is sized appropriately in some circumstances may not be sized appropriately in other circumstances. For example, a receive window that is too small may cause the network to he under-utilized. A receive window that is too large may increase network congestion, overwhelm the receiving device, and generally degrade network performance.

As one example of consumer impact, consider a home user connected to a high-speed broadband connection. The receive window size may be statically-configured, and set to a default size of 64 KB.

A sending device (sender) may send data to a receiving device (receiver). For example, the sender may send a packet, the receiver may receive the packet, and the receiver may send an acknowledgement signal (ACK) that acknowledges receipt of the packet. The sender may then receive the ACK. There may be a delay between the time the sender sends the packet and the time the sender receives the ACK. Such a delay may be called the round trip time (RTT).

In the U.S., a coast-to-coast connection (~3000 miles) may have an RTT of approximately 100 ms. With an RTT of 100 ms and a receive window size of 64 KB, the user may not be able to achieve more than 5 mbps per connection, even if the user has paid for 10 mbps broadband service. On connections with an RTT of 250 ms (e.g., for a connection from Redmond, Wash. to Australia), the user may not he able to achieve more than 2 mbps per connection. In both cases, the receive window may be too small to provide effective utilization of the available bandwidth. Thus, as the above example illustrates, a statically-configured receive window may prevent full bandwidth utilization for connections.

The RTT for a connection may also change over time. Data may be routed through various intermediate devices, and various bottlenecks may occur. For example, the data may pass through various routers. During communication, the RTT may be affected as router buffers fill (or empty) with data. As another example, a router or other intermediate device in the original path may crash, and the data may need to be sent over a different path. In some cases, the RTT for a connection may be dramatically impacted.

The inventors have appreciated that it may be desirable to provide a receive window with an appropriate size for the connection parameters. The size of the receive window may be dynamically updated over time. In one aspect of the invention, the updated receive window size may be calculated based on one or more parameters of the connection. For example, the receive window may be made larger for connections with a relatively large RTT than for connections with a relatively small RTT.

In one aspect of the invention, various parameters of the connection may be estimated, and the receive window size may be determined as a function of the estimated parameters. For example, some publications have identified the RTT-bandwidth product (RTT×bandwidth) as an effective receive window size for a connection. In one aspect of the invention, the receive window size may be calculated as a function of the RTT-bandwidth product. The receive window size may be dynamically updated, and may be changed over time to provide an effective receive window size as connection parameters change.

Aspects of the invention will now be described with respect to an example of a network environment in which the invention may be practiced, as illustrated FIG. 1.

FIG. 1 is a block diagram illustrating a network environment in which the invention may be practiced. The environment includes two devices 110 and 120 communicatively coupled to a network 100. Device 110 and device 120 may be any suitable computing environment, such as a general-purpose computer system described in further detail below, and may communicate by sending packets of data according to any suitable protocol, such as TCP/IP. However, packet-switched networks and related protocols need not necessarily be used. Any other suitable network may be used, such as a telephone network. The invention is not limited, to any particular type of network or protocol.

In this example, device 110 may be sender that sends packets (e.g., packets 102, 104 and 106) to device 120 via network 100. Device 120 may be a receiver that receives packets (e.g., packets 102, 104 and 106) from device 110. Once device 120 receives a packet, it may store the packet in a receive buffer 108.

A receive buffer may be a storage mechanism (e.g., a computer-readable medium) that may store received packets until they may be processed by device 120. A receive buffer may have any suitable size, e.g., 64 KB. Once data is stored in the receive buffer, an application may retrieve the data from the receive buffer 108 and process it.

Once device 120 receives a packet, it may send an acknowledgement signal (ACK) to device 110. The ACK may indicate to device 110 that the packet was received by device 120. For example, ACK 112 may indicate that packet 102 was received; ACK 114 may indicate that packet 104 was received and ACK 116 may indicate that packet 106 was received.

Device 120 may have a receive window 101 that it advertises to device 110. As one example, receive window 101 may have a relatively small receive window size: a receive window size only large enough to accept three packets from device 110. Device 120 may advertise the receive window 101 to device 110 indicating that device 110 may have three packets outstanding at any given time.

Device 110 may begin sending packets to device 120, and may send packets 102, 104 and 106. Once the third packet has been sent, device 110 may stop sending packets because it has three packets outstanding and has not yet received an ACK. At some point in time, packet 102 may be received by device 120 and ACK 112 may be sent to device 110. Once device 110 receives ACK 112, it now has only two packets outstanding (packets 104 and 106), and may send another packet to device 120.

A receive window size large enough for three packets has been discussed merely to illustrate the effect of a receive window. In practice, a larger or smaller receive window may be used. In some embodiments of the invention, the size of the receive window may be much larger.

The receive window may have a size that is defined in any suitable way (e.g., bits, bytes, packets, or any other suitable unit of data). The invention is not limited to any particular unit or representation of receive window size.

In addition, any suitable type of data may be sent. Data may be sent in any suitable format such as packets, datagrams, a stream of bits, an analog signal, or any other suitable format.

In one embodiment, the receive window 101 may be changed over time. For example, a new receive window size may be provided as a function of the RTT-bandwidth product for a connection. The receive window size may be set to the calculated receive window size.

The RTT and the bandwidth may be estimated using any suitable estimation algorithms. Various algorithms and techniques for estimating RTT are known in the art and therefore they will not be discussed in detail herein. The RTT may be estimated using known algorithms for this purpose or algorithms that are subsequently developed. The bandwidth for a connection may be estimated using an algorithm known as Adaptive Bandwidth Share Estimation (ABSE), or any other suitable algorithm. Further information about the ABSE algorithm may be found in a paper entitled, "Adaptive bandwidth share estimation in TCP Westwood," authored by Ren Wang et al. and appearing in the Global Telecommunications Conference, 2002.

ABSE has previously been used by sending devices to estimate the bandwidth for a connection and the rate at which data may be sent. The inventors have appreciated that it may be desirable to adapt ABSE for use by the receiver. ABSE may be used by the receiver to estimate the bandwidth for a connection, and also to estimate the rate at which data will be sent by the sender. One method of using ABSE by the receiver is descried in further detail below. Estimating parameters of the sending device using ABSE or another algorithm on the receiver may enable providing an appropriately sized receive window by the receiver.

The sending device may, for example, be in one of two different states of sending data: "slow-start" and "congestion-avoidance." The slow-start state may typically be used when the sending device is beginning to send data, and the rate of data being sent is increasing exponentially (e.g., doubling). Once the sending device determines that packets are being lost, it may determine that it is sending data too fast, and may reduce the rate of sending data. The sending device may then enter the congestion-avoidance state, in which the rate of data transfer is changed linearly, i.e., less quickly.

However, the receiving device may not know for certain whet the sending device is in the slow-start or congestion avoidance state. In one aspect of the invention, the receiving device may estimate the sending device's state based on amount of data received during multiple time intervals. As data is received, the amount of data received during each time interval may be determined and used to approximate the sending device's state. Thus, the receive window size may be set by anticipating a change in the rate at which data is sent.

In one embodiment of the invention, the ABSE algorithm may be used by the receiver to determine the bandwidth available for a connection, or eligible rate estimate (ERE). The receive window size may be determined as a function of the estimated RTT and the estimated bandwidth available. In some embodiments, the receive window size may be determined as A×(RTT×ERE), or A×(RTT×bandwidth), where A is a scaling factor.

Any suitable scaling factor may be used. In one embodiment, the scaling factor may be used to take into account an estimated state of the sending device. The scaling factor may be dynamically updated based on the estimated state of the sending device.

Figure 2:
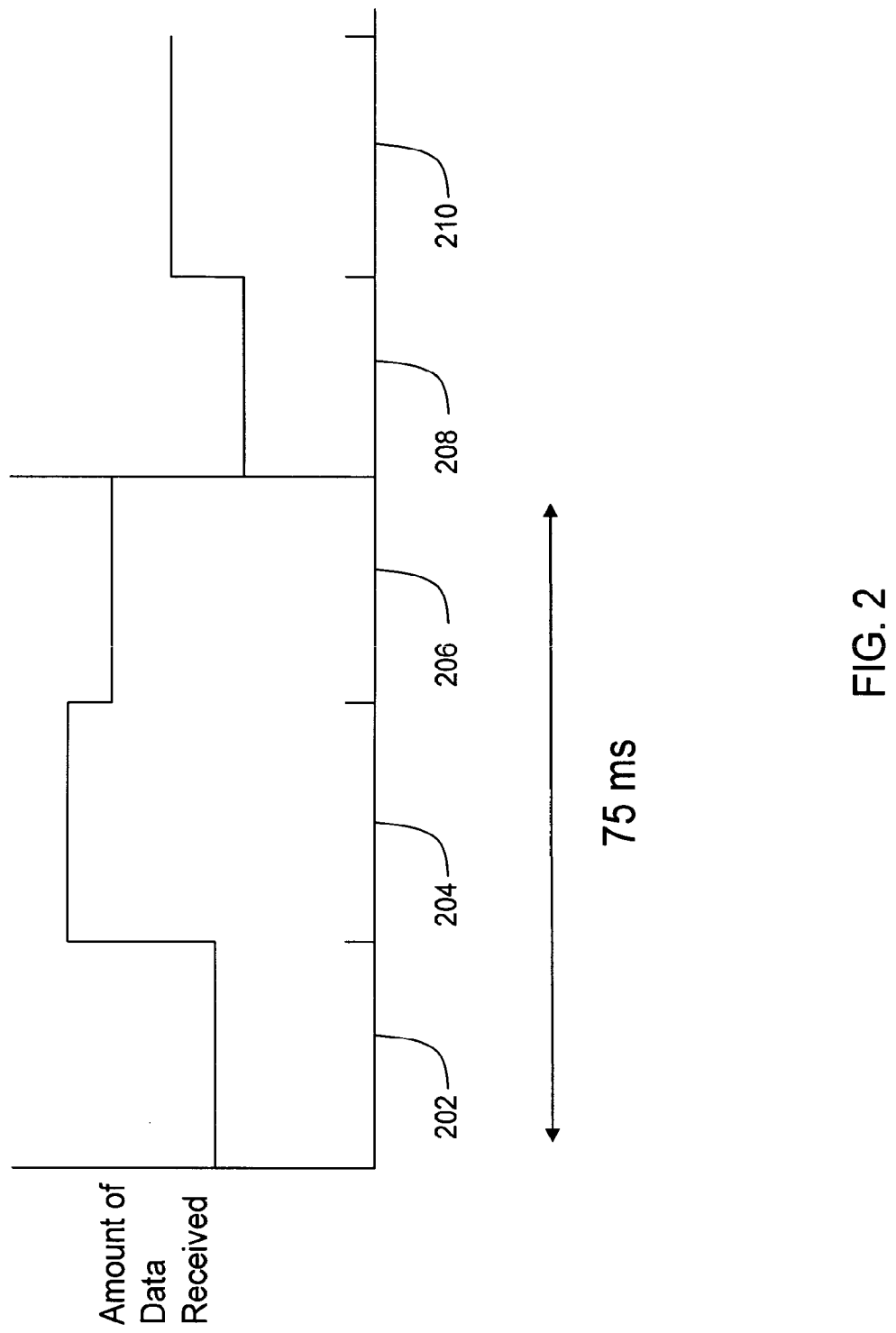
FIG. 2 is a block diagram illustrating an example of receiving data at successive time intervals.

FIG. 2 is a timing diagram that illustrates an example of measuring received data during consecutive time intervals. In this example, the RTT for the connection is 75 ms, and is divided up into three time intervals (e.g., 202, 204 and 206) of 25 ms each. For each time interval, the height of the corresponding bar in FIG. 2 may represent the total amount of data received during the time interval. In this example, more data was received during time interval 204 than during time interval 202.

Figure 3:
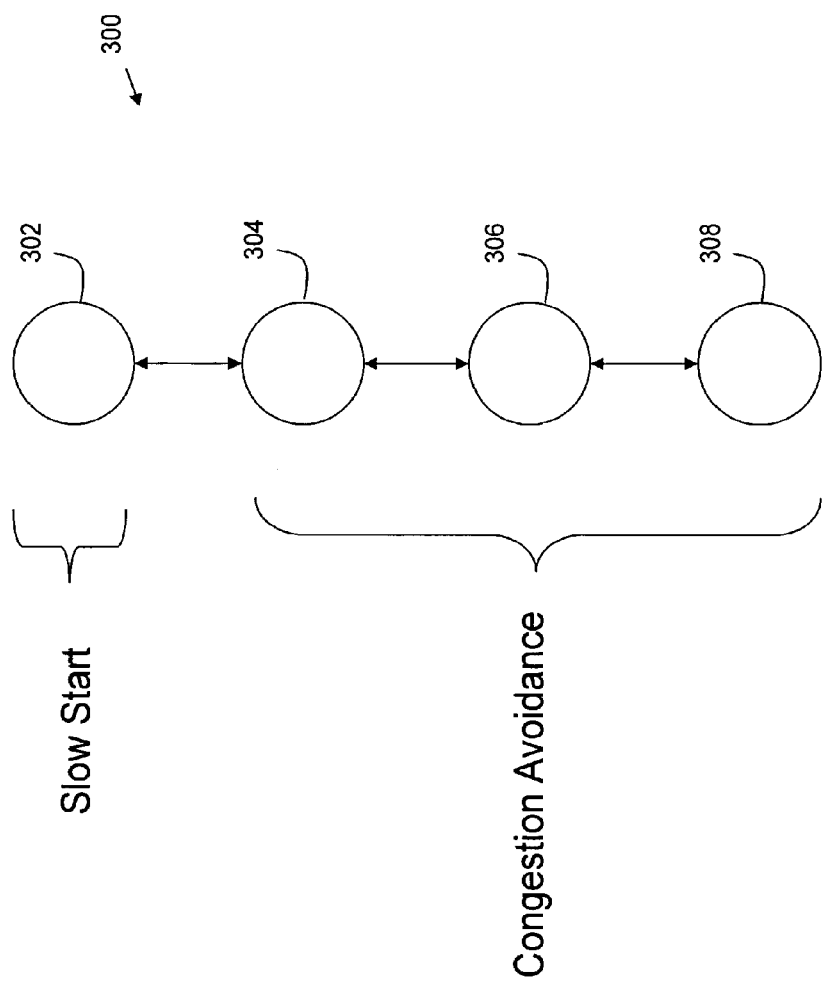
FIG. 3 is a state flow diagram illustrating the use of a state machine to estimate the sending device's state.

FIG. 3 is a state flow diagram illustrating the operation of a state machine 300 that may be used to estimate the sending device's state. In this embodiment, state machine 300 has four states: 302, 304, 306, and 308. When the state machine is in state 302, the sending device may be estimated by the receiver to be in the slow-start state. When the state machine is in any of the states 304, 306 and 308, the sending device may be estimated to be in the congestion-avoidance state.

The state of the state machine may be adjusted after each time interval (e.g., the time intervals illustrated in FIG. 2). In one embodiment of the invention, the amount of data received during the previous time interval may be compared to the amount of data received during the time interval one RTT prior to the previous time interval. If the amount of data received during the previous time interval is at least 1.5 times the amount of data received during the time interval one RTT prior to the previous time interval, then the state of the state machine may be changed to the adjacent state that is closer to the state that represents "slow-start" (e.g. closer to state 302). If the amount of data received during the previous time interval is less than 1.5 times the amount of data received during the time interval one RTT prior to the previous time interval, then the state of the state machine may be changed to the adjacent state that is farther from the state that represents "slow-start" (e.g., farther from state 302).

As one example, the state machine may initially be in state 302 which represents the sending device being in the slow-start state. At the end of time interval 208, the receiving device may compare the amount of data received during time interval 208 to the amount of data received in time interval 202. The receiving device may determine that the amount of data received in time interval 208 was less than 1.5 times the amount of data received during time interval 202, and the state machine may be incremented. Consequently, the state machine may be updated to be in state 304 which represents that the sending device is estimated to be in the congestion-avoidance state.

At the end of time interval 210, the receiving device may compare the amount of data received during time interval 210 to the amount of data received in time interval 204. The receiving device may determine that the amount of data received in time interval 210 was less than 1.5 times the amount of data received during time interval 204, and the state machine may be incremented. Consequently, the state machine may be updated to he in state 306 that represents that the sending device is estimated to be in the congestion-avoidance state.

In one aspect of the invention, the current state of the state machine may be used to determine the scaling factor A for setting the size of the receive window. For example, the scaling factor A may be set to be 2.0 when the sending device is believed to be in the slow-start state (state 302 of the state machine), and may he set to 1.25 when the sending device is estimated to be in the congestion avoidance state (states 304, 306 and 308 of the state machine). However, any suitable scaling factor may be determined based on the state of the state machine. The scaling factor may also be determined at least partially based on other factors, such as connection parameters, application parameters and/or operating system parameters.

The use of a state machine has been discussed as one way in which a receive window size may be determined. In the above example, a state machine has been illustrated as a way to determine the scaling factor based on estimating the state of the sending device. However, the state of the sending device need not necessarily be estimated, and any other suitable means may be used to obtain and/or estimate the state of the sending device.

It should be appreciated that the duration of the time intervals illustrated, in FIG. 2 have been given merely by way of illustration. Time intervals of any suitable duration may be used, and each time interval need not necessarily have the same duration. Furthermore, the number of time intervals used per RTT need not necessarily be three time intervals. Any other suitable number of time intervals may be used per RTT.

In one aspect of the invention, the duration of the time intervals that are used may be changed over time. For example, the length of the time intervals may be determined based on the RTT, the RTT-bandwidth product and/or the logarithm of the RTT-bandwidth product, and may be updated over time.

As discussed above, the ABSE algorithm may be used by the receiver to estimate the bandwidth for the connection. One difficulty with implementing ABSE on the receiver is that ABSE may require the size of the sender's congestion window as an input. However, the receiving device may not know the size of the sender's congestion window. To provide this input to ABSE, the receiver may estimate the sender's congestion window. The estimated congestion window may be provided to ABSE instead of the sender's actual congestion window.

The receiver's estimate of the sender's congestion window, the "estimated congestion window," may be represented as a number of bytes or any other any other suitable unit of data. The estimated congestion window may be set equal to zero bytes when a connection first begins. Alternatively, the estimated congestion window size may initially be set to any other suitable size.

The estimated congestion window may be updated based on the amount of data received over the connection. For example, at the end of each time interval, e.g., time interval 208 and 210, the estimated congestion window may be updated based on the estimated state of the sending device (e.g., slow-start or congestion avoidance). In one particular implementation, if the sender is estimated to be in the slow-start state, the size of the estimated congestion window may be increased by the amount of data received and acknowledged by the receiver during a time interval (e.g., during the time interval approximately one RTT prior to the most recent time interval). If the sender is estimated to be in the congestion avoidance state, the size of the estimated congestion window may be increased by a maximum segment size (or a TCP packet size) divided by the number of time intervals currently used per RTT. The estimated state of the state machine may be determined based on the current state of state machine 300, as discussed above.

The technique described is merely one way of adapting ABSE for use by a receiver. Any other suitable method may be used to estimate the sender's congestion window size. For example, the method described above does not take into account that the sender's actual congestion window may sometimes decrease. This method may be modified in future versions to take that aspect into account and perhaps more accurately estimate the sender's congestion window. Other methods may be developed which take into account this aspect of the sender's congestion window. The technique described above has been presented merely by way of illustration.

As discussed above, the ABSE algorithm need not necessarily be used to estimate the bandwidth of a connection. Other algorithms that are known or developed hereafter may replace or supplement the ABSE algorithm.

Figure 4:
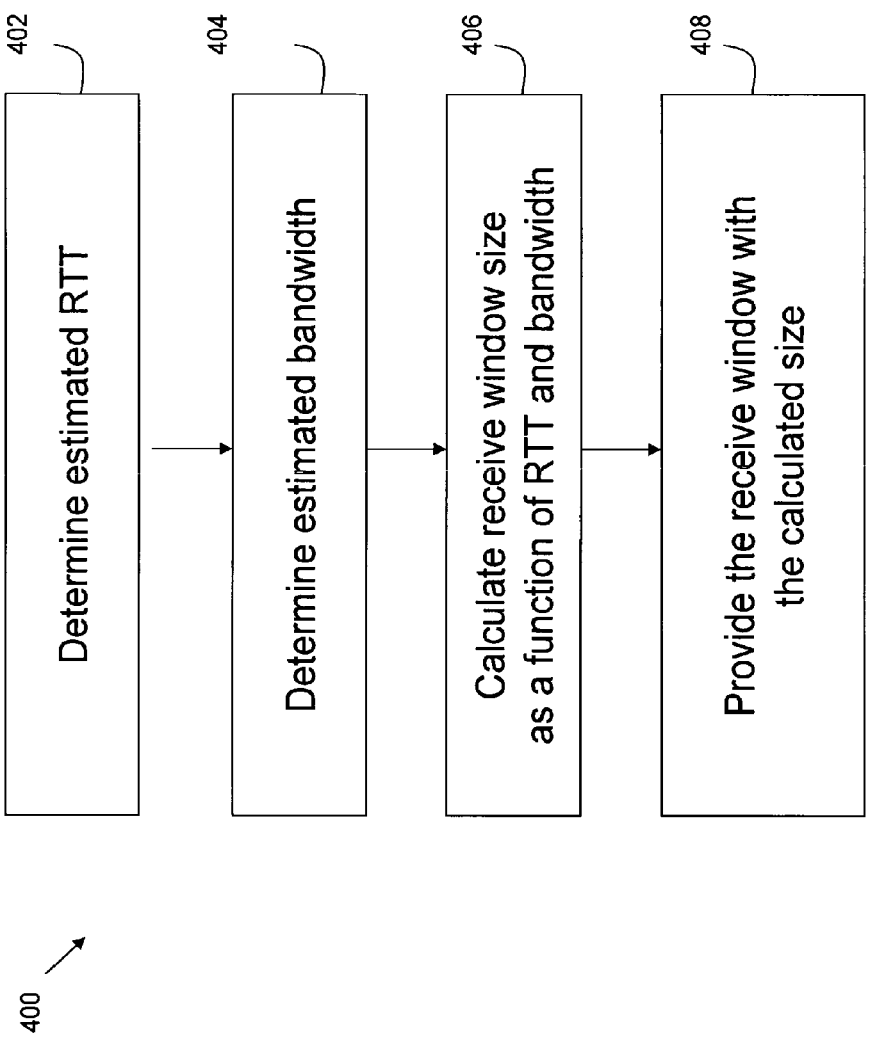
FIG. 4 is a block diagram illustrating an example of a method of communicating over a network using a receive window.

FIG. 4 illustrates an example of a method of communicating over a network using a receive window.

In act 402, the RTT for a connection may be estimated using any suitable algorithm. The RTT may be estimated at regular intervals and/or may be determined in response to changes associated with the connection and/or device.

In act 404, the bandwidth for a connection may be estimated. The bandwidth may be estimated using any suitable algorithm, such as the ABSE algorithm discussed above.

In act 406, a calculated receive window size may be determined as a function of the estimated RTT and bandwidth. To determine the receive window size, the MT-bandwidth product may be calculated. The RTT-bandwidth product may multiplied by a scaling factor that is determined based on an estimated state of the sending device, as discussed above.

The calculated receive window may be calculated as a function of connection parameters (e.g., estimated RTT and bandwidth), operating system parameters, application parameters and any suitable combination thereof. For example, the calculated receive buffer size may be modified if an application cannot process the received data quickly enough. In some circumstances, a receive buffer may fill up more quickly than an application can process the received data and remove it from the receive buffer. In response, the receive window size may not be allowed to increase, temporarily. Alternatively, the receive window size may be increased at a slower rate.

As one example, the amount of data received in the receive buffer during a time period may be determined. The amount of data removed from the receive buffer (e.g., in response to an application request) during the time period may be measured. If the amount of data removed from the receive buffer during the time period is greater than the 75% of the amount of data received during the time period, then the receive window may be provided with the calculated receive window size. If the amount of data removed from the receive buffer during the time period is less than the 75% of the amount of data received during the time period, then the receive window may be prevented from being changed. In this example, the calculated receive window size may be determined as a function of the speed with which an application can remove data from the receive buffer.

As another example, the calculated receive window size may be modified based on operating system parameters. For example, if the receiving device's total buffer space (e.g., RAM) that is being used exceeds a threshold, then the receive window may not be allowed to increase in size temporarily. Alternatively, the receive window size that is calculated may be altered in response to the buffer being full. As a specific example, on a 64 bit platform the receive window may not be allowed to increase in size if more than 8 MB of RAM is being used and more than ¼ of the total RAM is being used. On a 32 bit platform the receive window may not be allowed to increase in size if more than 8 MB of RAM is being used and more than 1/32 of the total RAM is being used.

As a further example, the calculated receive window size may be modified based on the amount of receive buffer space used by a connection. If a connection is using a larger portion of the receive buffer than other connections, then the receive window size for that connection may be adjusted accordingly. For example, the receive window size for that connection may be decreased, may not be allowed to increase, or may only be allowed to increase slowly.

In one aspect of the invention, when a connection is first established the receive window may be provided with a nominal receive window size (e.g., 64 KB, 32 KB, or any other suitable size). The receive window may be prevented from ever being smaller than the nominal receive window size.

The act 406 may be performed at several points in time to update the size of the receive window. In one aspect of the invention, the updating may be automatically performed by operating system according to a pre-determined schedule. For example, the updating may occur at regular intervals. As another example, the act 406 may be performed in response to activity on the connection. If the connection is idle for a long period of time, then the act 406 may not be performed until further activity occurs. The act 406 may be performed in response to data being transferred over the connection. In some circumstances, there may be a delay in performing the act 406 while the amount of received data is determined and various parameters (e.g., connection parameter, operating system parameters, and application parameters) are determined.

In act 408, a receive window may be provided with the receive window size calculated in the act 406. As one example, the receive window may be provided with the calculated receive window size by setting the size of the receive buffer to the calculated receive window size.

The acts of method 400 need not necessarily be performed in the order illustrated in FIG. 4. Acts 402, 404, 406 and 408 may be performed in any suitable order, and in some circumstances acts may be performed concurrently. Acts 402, 404, 406 and 408 may occur at different rates, or they may occur at the same rate. For example, connection parameters may be determined in acts 402 and 404 more frequently than the receive window size is determined in the act 406. Method 400 may include other acts in addition to acts 402, 404, 406 and 408. For example, after or during the act 408, the receive window may be advertised to the sender.

As discussed above, the receive window size may be the size of the receive buffer minus any data currently stored in the receive buffer, per TCP convention. It should be appreciated that the actual size of the receive window may change independently of the receive window size that is provided in the act 406. For example, as data accumulates in the receive buffer, the size of the receive window that is advertised to the sender may be decreased. For example, the size of the receive buffer may be set to the calculated receive buffer size (as discussed above) minus the amount of data stored in the receive buffer. Thus, aspects of the invention may provide a "nominal" receive window size which may be changed to be in accordance with network protocols, e.g., TCP.

Particular ways of implementing aspects of the invention will now be described.

Methods described herein, acts thereof and various embodiments and variations of these methods and acts, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs that, as a result of being executed by a computer, instruct the computer to perform one or more of the functions described herein, and/or various embodiments, variations and combinations thereof. Such instructions may be written in any of a plurality of programming languages, for example, Java, J#, Visual Basic, C, C#, C++, Fortran, Pascal, Eiffel, Basic, COBOL, etc., or any of a variety of combinations thereof. The computer-readable media on which such instructions are embodied may reside on one or more of the components of any of systems described herein, may be distributed across one or more of such components, and may be in transition therebetween.

The computer-readable media may be transportable such that the instructions stored thereon can be loaded onto any suitable computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. Further, the embodiments may be located on a single computer or may be distributed among a plurality of computers attached by a communications network.

For example, various aspects of the invention may be implemented as specialized software executing in a general-purpose computer system. The computer system may include a processor connected to one or more memory devices, such as a disk drive, memory, or other device for storing data. Memory is typically used for storing programs and data during operation of the computer system. Components of the computer system may be coupled by an interconnection mechanism, which may include one or more busses (e.g., between components that are integrated within a same machine) and/or a network (e.g., between components that reside on separate discrete machines). The interconnection mechanism enables communications (e.g., data, instructions) to be exchanged between system components. The computer system also includes one or more input devices, for example, a keyboard, mouse, trackball, microphone, touch screen, and one or more output devices, for example, a printing device, display screen, speaker. In addition, the computer system may contain one or more interfaces that connect the computer system to a communication network (in addition or as an alternative to the interconnection mechanism.

The storage system typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system, or in the memory system. The processor generally manipulates the data within the integrated circuit memory and then copies the data to the medium after processing is completed. A variety of mechanisms are known for managing data movement between the medium and the integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although the computer system discussed by way of example as one type of computer system upon which various aspects of the invention may be practiced, it should be appreciated that aspects of the invention are not limited, to being implemented on the computer system. Various aspects of the invention may be practiced on one or more computers having a different architecture or components.

The computer system may be a general-purpose computer system that is programmable using a high-level computer programming language. The computer system may be also implemented using specially programmed, special purpose hardware. In the computer system, the processor is typically a commercially available processor such as the well-known Pentium class processor available from the Intel Corporation. Many other processors are available. Such a processor usually executes an operating system which may be, for example, the Windows Server™ 2003, Windows® 95, Windows® 98, Windows NT®, Windows® 2000, Windows® ME, or Windows® XP operating systems available from Microsoft Corporation, MAC OS System X available from Apple Computer, the Solaris Operating System available from Sun Microsystems, UNIX available from various sources or Linux available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to communications network 100. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

Network 100 may be any suitable type of network such a local area network (LAN), wide area network (WAN), intranet, Internet or any combination thereof. For illustrative purposes, a limited number of devices are shown in this example. However, it is to be appreciated that many devices may be coupled to network 100. Although the devices are illustrated as being coupled directly to the network 100, the devices may be coupled to the network through one or more servers, routers, proxies, gateways, network address translation devices or any suitable combination thereof.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, (J-Sharp) or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method comprising: determining, by a receiving device that includes at least one processor and memory, a receive window size based on estimating whether a sending device that sends data over a network to the receiving device is in a slow-start state or a congestion-avoidance state, where the estimating is based on an amount of data received during each of multiple time intervals.

2. The method of claim 1 where the multiple time intervals are consecutive.

3. The method of claim 1 where each of the multiple time intervals is a portion of a round-trip time ("RTT") between the sending device and the receiving device.

4. The method of claim 1 where the estimating is performed by a state machine initially in a first state.

5. The method of claim 4 further comprising: changing a current state of the state machine to an adjacent state that is further from the first state than the current state, the changing in response to an amount of data received during one of the multiple time intervals being a specific amount less than that of a preceding one of the multiple time intervals.

6. The method of claim 4 further comprising: changing a current state of the state machine to an adjacent state that is closer to the first state than the current state, the changing in response to an amount of data received during one of the multiple time intervals being a specific amount more than that of a preceding one of the multiple time intervals.

7. The method of claim 4 where the state machine being in the first state represents an estimation that the sending device is in the slow-start state, and where the state machine being in any state other than the first state represents an estimation that the sending device is in the congestion-avoidance state.

8. At least one computer storage device storing computer-executable instructions that, based on execution by a receiving device that includes at least one processor and memory, configure the receiving device to perform actions comprising: determining a receive window size based on estimating of whether a sending device that sends data over a network to the receiving device is in a slow-start state or a congestion-avoidance state, where the estimating is based on an amount of data received during each of multiple time intervals.

9. The at least one computer storage device of claim 8 where the multiple time intervals are consecutive.

10. The at least one computer storage device of claim 8 where each of the multiple time intervals is a portion of a round-trip time ("RTT") between the sending device and the receiving device.

11. The at least one computer storage device of claim 8 where the estimating is performed by a state machine initially in a first state.

12. The at least one computer storage device of claim 11, the actions further comprising: changing a current state of the state machine to an adjacent state that is further from the first state than the current state, the changing in response to an amount of data received during one of the multiple time intervals being a specific amount less than that of a preceding one of the multiple time intervals.

13. The at least one computer storage device of claim 11, the actions further comprising: changing a current state of the state machine to an adjacent state that is closer to the first state than the current state, the changing in response to an amount of data received during one of the multiple time intervals being a specific amount more than that of a preceding one of the multiple time intervals.

14. The at least one computer storage device of claim 11 where the state machine being in the first state represents an estimation that the sending device is in the slow-start state, and where the state machine being in any state other than the first state represents an estimation that the sending device is in the congestion-avoidance state.

15. A system comprising a receiving device and at least one program module that are together configured for performing actions, where the receiving device includes at least one processor and memory, the actions comprising: determining a receive window size based on estimating of whether a sending device that sends data over a network to the receiving device is in a slow-start state or a congestion-avoidance state, where the estimating is based on an amount of data received during each of multiple time intervals.

16. The system of claim 15 where the multiple time intervals are consecutive.

17. The system of claim 15 where each of the multiple time intervals is a portion of a round-trip time ("RTT") between the sending device and the receiving device.

18. The system of claim 15 where the estimating is performed by a state machine initially in a first state.

19. The system of claim 18, the actions further comprising:
changing a current state of the state machine to an adjacent state that is further from the first state than the current state, the changing in response to an amount of data received during one of the multiple time intervals being a specific amount less than that of a preceding one of the multiple time intervals; and
changing a current state of the state machine to an adjacent state that is closer to the first state than the current state, the changing in response to an amount of data received during one of the multiple time intervals being a specific amount more than that of a preceding one of the multiple time intervals.

20. The system of claim 18 where the state machine being in the first state represents an estimation that the sending device is in the slow-start state, and where the state machine being in any state other than the first state represents an estimation that the sending device is in the congestion-avoidance state.

* * * * *